US006158292A

United States Patent [19]

Gilson et al.

[11] Patent Number: 6,158,292

[45] Date of Patent: Dec. 12, 2000

[54] PIPETTE

[76] Inventors: Warren E. Gilson, 601 N. Segoe Rd., Unit 104, Madison, Wis. 53705; Robert E. Gilson, 3731 County Hwy. M, Middleton, Wis. 53562

[21] Appl. No.: 09/373,488

[22] Filed: Aug. 12, 1999

Related U.S. Application Data

[63] Continuation of application No. 08/919,690, Aug. 28, 1997, abandoned, which is a continuation of application No. 08/740,818, Nov. 4, 1996, abandoned.

[51] Int. Cl.[7] .................................................. G01N 1/14

[52] U.S. Cl. .................................... 73/864.01; 73/864.14; 73/864.18

[58] Field of Search ............................ 73/864.14, 864.16, 73/864.17, 864.18; 422/100

[56] References Cited

U.S. PATENT DOCUMENTS

| | | | |
|---|---|---|---|
| Re. 32,210 | 7/1986 | D'Autry . | |
| 3,786,683 | 1/1974 | Berman et al. | 73/864.14 |
| 3,827,305 | 8/1974 | Gilson et al. . | |
| 4,616,514 | 10/1986 | Magnussen, Jr. et al. . | |
| 5,213,764 | 5/1993 | Kerr et al. | 73/864.14 |
| 5,435,197 | 7/1995 | Telimaa et al. | 73/864.14 |

*Primary Examiner*—Hezron Williams
*Assistant Examiner*—Nashmiya Fayyaz
*Attorney, Agent, or Firm*—Mason, Kolehmainen, Rathburn & Wyes; Philip M. Kolehmainen

[57] ABSTRACT

A pipette for transferring liquid samples includes a body having a handle and a base. A piston assembly is axially movable in the body. A movable lower stop is placed in the path of the piston assembly to stop the piston to limit the length of an intake stroke and is withdrawn from the path to permit axial overtravel during a discharge stroke. The lower stop is positively controlled by a manually operated mechanism including a stop control push button at the top of the handle in front of a piston push button. A mechanism for ejecting a tip from the base includes a lever at the top of the handle providing a mechanical advantage when pressed at either end. In an alternate embodiment, a dual spring overtravel arrangement is used, with the piston return spring telescoped within the overtravel spring.

3 Claims, 5 Drawing Sheets

PIPETTE

This is a continuing application of application Ser. No. 08/919,690 filed Aug. 28, 1997, now abandoned which is a continuation application of application Ser. No. 08/740,818, filed Nov. 4, 1996, now abandoned.

FIELD OF THE INVENTION

The present invention relates to pipettes, and more particularly to improvements in discharge stroke control, tip ejection and ergonomics of pipettes.

DESCRIPTION OF THE PRIOR ART

Pipettes are used for transferring liquid samples having a precisely measured volume. A piston assembly is moved in an intake stroke, first down into a pipette body and then up to draw a sample into a sample receiving region, such as a disposable tip. Then the piston assembly is again moved down in a discharge stroke to expel the sample from the sample receiving region. It is desirable that the piston travel farther in the downward direction during the discharge stroke than during the intake stroke so that the resulting overtravel positively expels the entire sample.

U.S. Pat. No. 3,827,305 discloses a pipette typical in many respects of the prior art. A main spring biases the piston in the upward direction, and the user overcomes the force of this spring when moving the piston down. An overtravel spring biases a lower stop to a normal position where it limits downward travel of the piston during the intake stroke. During the discharge stroke, the user forces the piston to overtravel by overcoming the force of the overtravel spring as well as the main spring so that the lower stop is moved down from its normal position.

This known lower stop arrangement requires skill and strength. During the intake stroke the user must move the piston down all the way to the lower stop to assure that a full sample is drawn up. But the user must not move the piston beyond its initial contact with the lower stop, or else the sample is too large. A user therefore must detect by feel the proper downward limit of the intake stroke.

Typically the overtravel spring is stronger than the main spring. A stiff overtravel spring aids the user in detecting contact of the piston against the lower stop without moving the lower stop during the intake stroke. In pipettes where the overtravel spring serves an additional function of applying force to a lower seal, a stiff spring also increases the sealing effect. The use of a strong overtravel spring requires the user to apply a relatively large force during the discharge stroke to overcome the overtravel spring force and move the lower stop.

U.S. Pat. Nos. 3,506,784, 3,766,784 and 4,435,989 disclose pipettes having indexing mechanisms with rotatable members responsive to piston movement for alternately limiting downward motion with spaced lower stops to achieve relatively shorter and longer intake and discharge strokes respectively. The alternate action is automatic, with no user input other than repetitive piston operation. Although these devices eliminate the need for the user to overcome a large spring force for overtravel movement, they are undesireably complicated, expensive and delicate. In addition, the absence of positive user control of the ability of the piston to overtravel during a discharge stroke can lead to inadvertent interchange of the intake and discharge strokes and resulting error.

An object of the present invention is to provide an improved pipette in which the stroke length is easily and positively changed by the user between intake and discharge strokes and overtravel is accomplished without the need for the user to apply large forces or to be careful not to inadvertently move a lower stop during the intake stroke.

Another object of the invention is to provide a pipette having a dual spring overtravel system requiring a smaller spring force than known arrangements.

When a sample is drawn into a pipette and then discharged, it is desirable that no remnant of that sample contaminate a subsequent sample. A separate tip is typically mounted on the lower tubular end of the pipette body before handling of each sample. The tip is large enough to contain the entire sample, so that the body of the pipette is not contaminated. After the sample is discharged, the tip is ejected from the pipette body and discarded so that no cross sample contamination is possible.

U.S. Pat. No. RE. 32,210 discloses a device for ejecting a removable tip from a pipette. A tip is pushed onto the pipette body where it is held by friction. After use, a button at the top of the pipette is depressed axially by the thumb of the user. A rod and sleeve are moved down to push the tip free of the pipette body. In this arrangement, the button is at the back of the pipette and the tip of the thumb of the user must be moved back toward the base of the thumb to press the button. The thumb joints thus are sharply flexed, and in this position the user must apply to the button an axial force sufficient to compress a tip ejector return spring and to overcome the friction holding the tip in place.

It is an object of the present invention to provide an improved tip ejection arrangement for a pipette making it easier for the user to eject a tip from the pipette by applying force at a comfortable location away from the back of the pipette, and accomplishing tip ejection with a relatively small user force requirement.

U.S. Pat. Nos. RE. 32,210 and 5,018,394 disclose the shape of a conventional pipette. The pipette body includes an axially extending handle portion grasped in the hand of a user. The fingers wrap around the front of the handle and a radially extending lip over the forefinger of the user helps position the hand and provides a surface for the application of upward reaction force as the piston push button is pressed by the thumb. The palm of the user is at the back of the handle and the thumb is at the top of the pipette where the piston push button and the tip ejector push button are located. The handle has an oval shape due to an enlargement at the back of the handle. This enlargement accommodates a passageway for the ejector push rod, and is received in the user's palm.

The oval shape of the handle is comfortable for a user with medium or large hands, but is too large for a user with small hands. A user with a small hand cannot comfortably grasp the handle and also reach the top of the piston push button with the thumb. There is no way for a user to tailor the handle size and shape for individual comfort preferences. In addition, the user must maintain the palm against the back of the handle to avoid dropping the pipette because it cannot be held by the fingers alone.

Another object of the present invention is to provide a pipette with improved ergonomic features permitting comfortable use by users with hands of all sizes and making it easier to securely hold the pipette with a relaxed or partial grip of the handle.

SUMMARY OF THE INVENTION

In brief, in accordance with one aspect of the present invention, there is provided a pipette having a body and a piston assembly mounted for movement along a path of movement in an axial direction in the body in intake and discharge strokes. An upper stop defines an upper limit for movement of the piston assembly in the intake and discharge strokes and a lower stop normally located in the path of movement defines a lower limit for movement of the piston assembly in the intake stroke. The pipette is characterized by the lower stop being mounted for movement in the body into and out of the path of movement. Manually operable means move the lower stop out of the path of the piston assembly for permitting the piston assembly to overtravel during the discharge stroke.

In brief, in accordance with another aspect of the present invention, there is provided a pipette for transferring liquid samples and having a body including a lower base and a handle. The handle has a front adapted to be grasped by the fingers of a user, a back adapted to be grasped in the palm of a user and a top adapted to be near the thumb of a user. A piston assembly moves axially in the body along a path of movement. The piston assembly includes a piston push button. The lower base has a lower end adapted to frictionally support a tip. A tip ejection mechanism for forcing a tip from the lower base includes a tip ejection button. A movable lower stop is mounted in the body for movement into and out of the path of movement. A stop control mechanism for manually moving the lower stop includes a stop control push button. The piston push button, the tip ejection button and the stop control button are all mounted at the top of the handle.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 1:
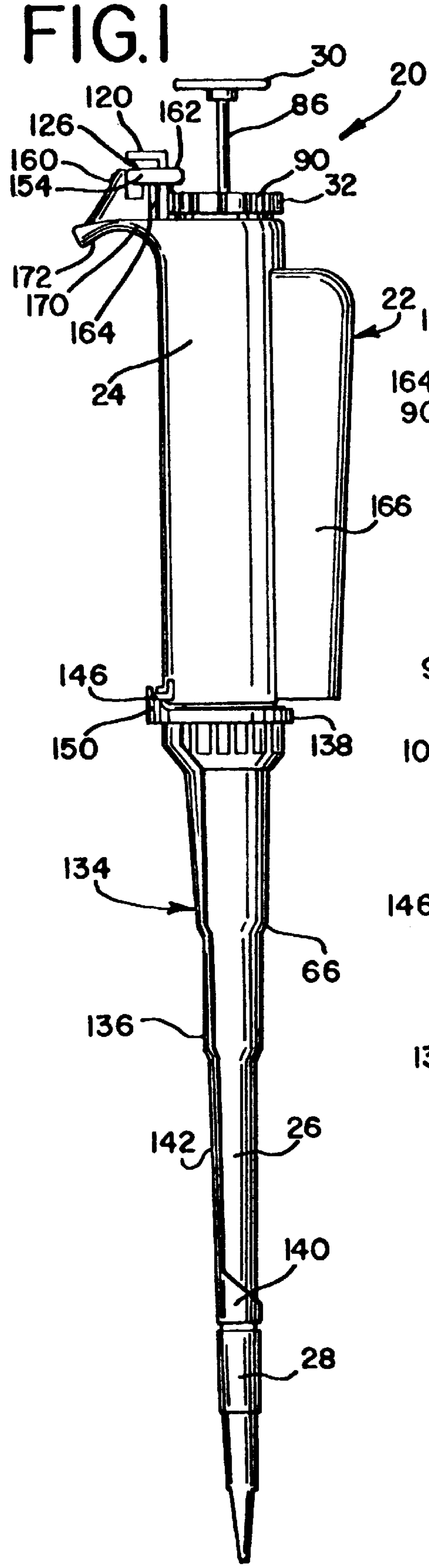
FIG. 1 is side elevational view of a pipette constructed in accordance with the present invention shown with the removable tip in place.
Figure 2:
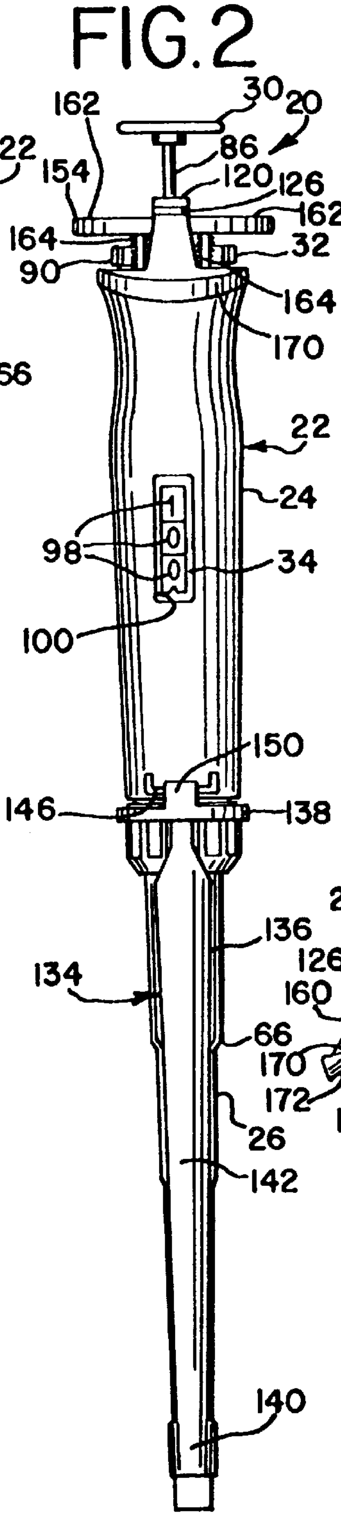
FIG. 2 is a front elevational view of the pipette with the tip removed.
Figure 3:
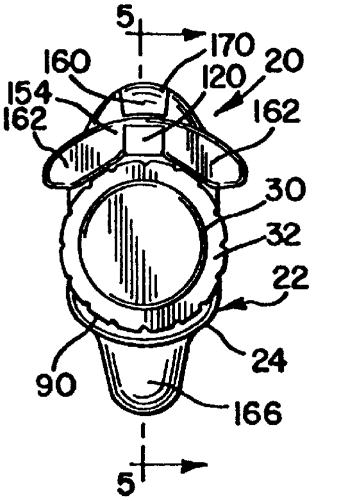
FIG. 3 is a top view of the pipette.

Having reference now to the drawings, and initially to FIGS. 1–3, there is shown a pipette constructed in accordance with the principles of the present invention and generally designated as 20. The pipette 20 includes a body generally designated as 22 having an upper handle member 24 and a generally tubular lower base 26. A hollow tip 28 having an open lower end is frictionally held with a leak tight fit on the base 26, and a piston push button 30 is operated by the user to draw a liquid sample into and then discharge the liquid sample from the tip 28. A sample size adjustment knob 32 is operated to select a sample size, and the selected size is seen at a sample size display 34.

Figure 5:
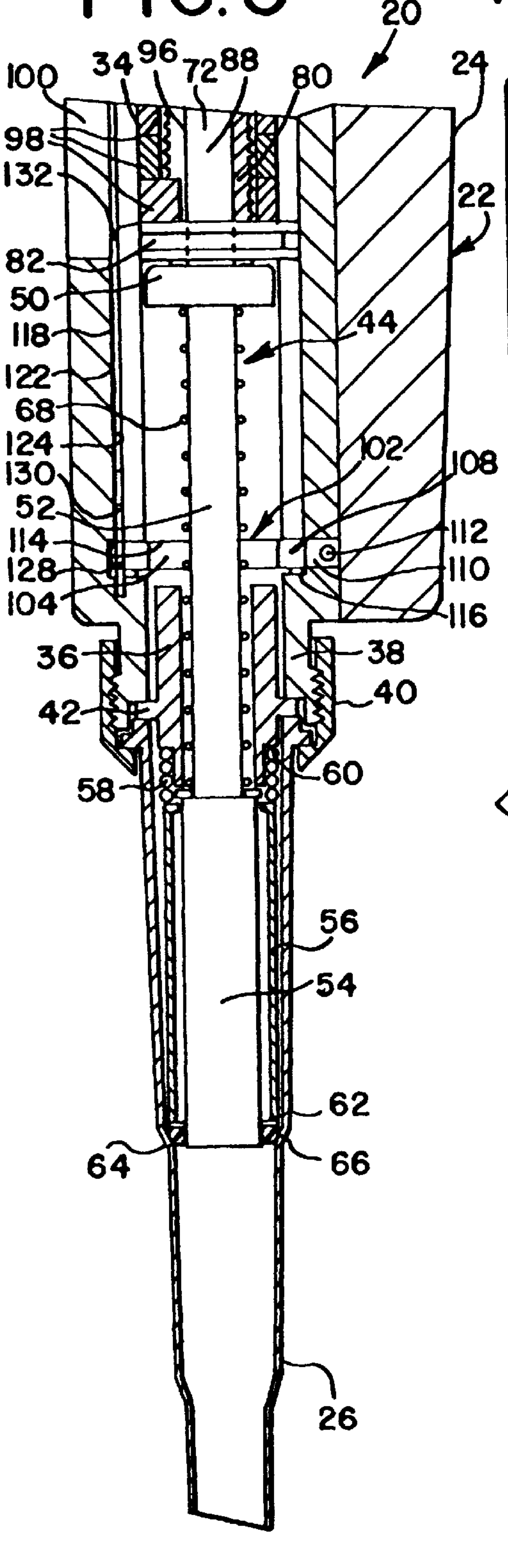
FIG. 5 is a fragmentary, enlarged, axial sectional view of components of the pipette taken along the line 5—5 of FIG. 3.
Figure 6:
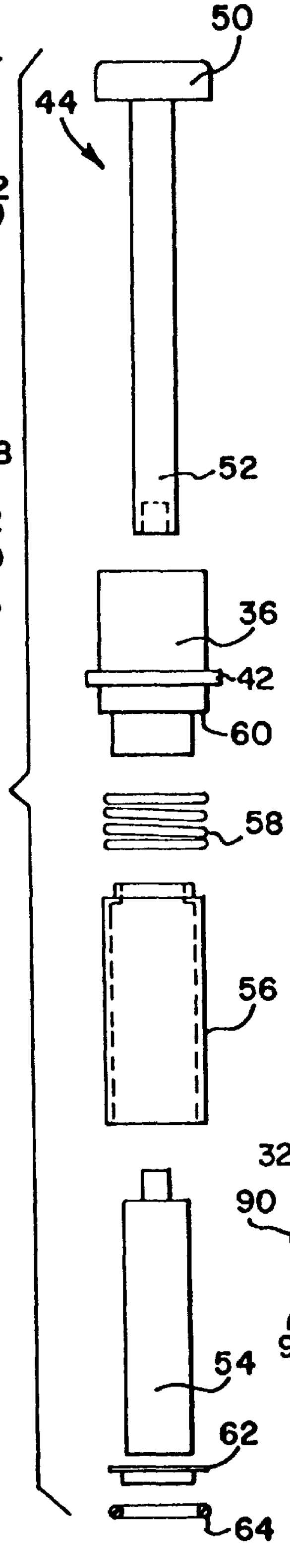
FIG. 6 is an enlarged, exploded elevational view of components of the pipette including parts of the piston assembly and the piston seal arrangement.

A spring spacer 36 is captured between the handle member 24 and the lower base 26 (FIGS. 5 and 6). The lower end of the handle member 24 includes a threaded collar 38 mating with a coupling nut 40. When nut 40 is tightened, a flange 42 of the spacer 36 is held between the upper edge of the base 26 and an internal shoulder within the collar 38.

An axially movable piston assembly designated as a whole as 44 includes a shank 52 seen in FIGS. 5 and 6. This shank 52 includes at its upper end a cap 50. The lower end of shank 50 is connected by a force fit to a tubular piston 54.

A seal is provided between the piston assembly 44 and the base 26 of the body 22. A sleeve 56 is slidably telescoped around the piston 54. A seal spring 58 is held in compression between a downwardly facing shoulder 60 on the spring spacer 36 and the top of the sleeve 56. The lower end of the sleeve 56 applies the seal spring force through a flanged sealing collar 62 to an O-ring seal 64. This force wedges the seal 64 against an inclined housing shoulder 66 and the flanged sealing collar is compressed in sealing relation against the side wall of the axially movable piston 54.

The pipette of FIGS. 1–16 differs from those prior art pipettes wherein the seal spring is used to establish the beginning of the overtravel range. In such arrangements, as disclosed for example in U.S. Pat. No. 3,827,305, the user must overcome the force of the seal spring during overtravel movement of the piston in a discharge stroke. In the arrangement of FIGS. 1–16, a relatively strong seal spring 58 may be used to assure a reliable seal between the piston 54 and the body base 26 without requiring the use of a large force by the user.

A piston return spring 68 continuously biases the piston assembly 44 toward its uppermost, standby position. The lower end of spring 68 engages the upper reduced diameter collar at the top of the sleeve 56. The spring 68 is held in compression around the shank 52 with its upper end in engagement with the underside of the cap 50. Cap 50 is thus normally held in its uppermost position against the lower end of a piston spindle 72.

Figure 7:
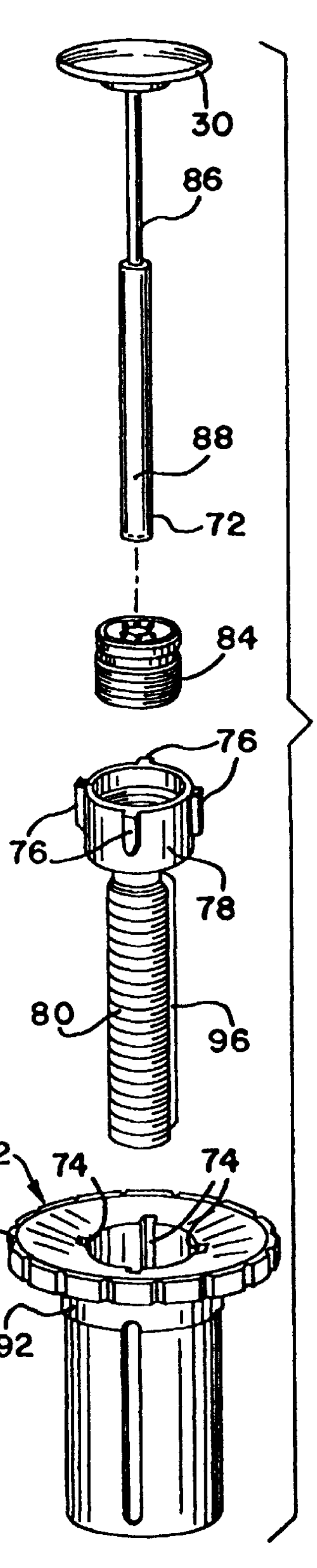
FIG. 7 is an enlarged, exploded isometric view of components of the pipette including parts of the piston assembly and the sample size adjustment and calibration arrangement.
Figure 8:
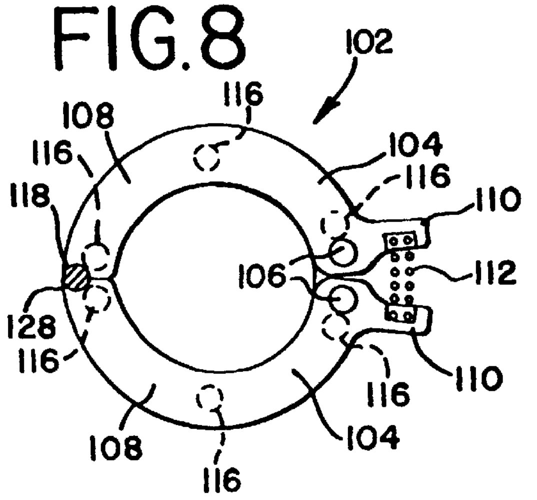
FIG. 8 is an enlarged top view of the lower stop assembly in its normal, closed position.
Figure 9:
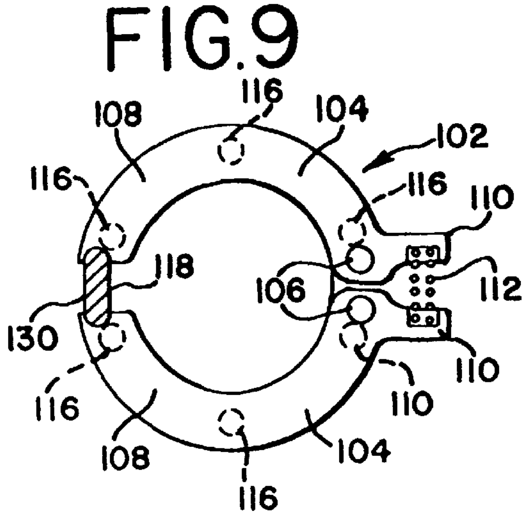
FIG. 9 is enlarged top view of the lower stop assembly in its open, overtravel position.
Figure 10:
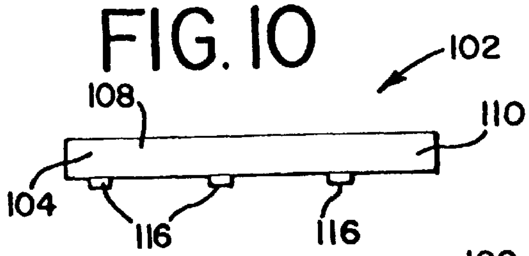
FIG. 10 is a side view of the lower stop assembly of FIG. 8.

The volume of a liquid sample to be drawn into the pipette 20 is precisely adjustable by using a knurled head 90 of the adjustment knob 32 to vary the upper limit of movement of the piston assembly 44. The knob 32 has internal grooves 74 that slidably receive drive ribs 76 on a drive head 78 that is attached, for example by overmolding, to the top of a volume adjusting screw 80 (FIG. 7). Threads of the adjusting screw 80 are engaged with internal threads of a nut 82 that is fixed within the body 22. Rotation of the knob 32 rotates the screw 80 and the threaded engagement with nut 82 results in axial movement of the screw 72 throughout a range of positions.

An upper stop 84 is threaded into an internal bore of the drive head 78. The spindle 72 includes a reduced diameter stem 86 that extends through a central bore in the upper stop 84. An enlarged lower portion 88 of the spindle 72 has an upper shoulder that bears against the stop 84 in the uppermost position of the piston assembly 44. Moving the upper stop downward reduces the range of axial movement of the piston assembly 44 and reduces the sample size. The adjustment is calibrated by rotation of the upper stop 84 relative to the drive head 78.

Knob 32 includes a knurled head 90 and a collar portion 92 that may be interlocked with a bore in the body handle 24 by an interference fit in order to prevent inadvertent misadjustment of the selected volume size. Alternatively the knob 32 may be unlocked by upward axial movement and then rotated to change the sample size. A further description of this volume adjustment structure and operation may be found in pending U.S. patent application Ser. No. 08/506,214 filed on Jul. 24, 1995, now U.S. Pat. No. 5,650,124, incorporated herein by reference.

The display 34 provides an indication of the selected sample size. The volume adjustment screw 80 includes an axially extending drive slot 96 that is coupled to one of a plurality of counter wheels 98 displaying sample volume size in units, tens and hundreds. Rotation of the screw 80 not only changes the sample size but also changes the positions of the counter wheels 98 to display the sample size. The counter wheels 98 may be viewed through a window 100 in the body 22. A further description of a display suitable for use with the pipette 20 may be found in U.S. Pat. No. 3,827,305, incorporated here by reference.

A liquid sample of the selected volume is drawn into the tip 28 during an intake stroke. To prepare for the intake stroke, the user presses the push button 30 to move the piston assembly 44 down. Then the lower end of the tip 28 is immersed in a liquid and the return spring 68 raises the piston assembly 44 to its uppermost position with the enlarged portion 88 of the piston spindle 72 contacting the upper stop 84. Because the dual seal 62 and 64 provides a seal between the piston 54 and the base 26 of the body 22, the reduced pressure below the upwardly moving piston 54 draws the liquid sample into the tip 28.

The liquid sample is then expelled from the tip 28 during a discharge stroke. The user again presses the push button 30 to move the piston assembly 44 down. The increase in pressure below the descending piston 54 forces the liquid sample to flow out of the lower end of the tip 28. Following this discharge stroke, the return spring 68 lifts the piston assembly to its uppermost position in readiness for the next intake stroke.

In order to assure that the entire sample is discharged, the axial travel of the piston assembly 44 is greater in the discharge stroke than in the intake stroke. In accordance with a feature of the present invention, a positively controlled lower stop generally designated as 102 provides two different stroke lengths. Normally the lower stop 102 is in the path of movement of the piston assembly and limits axial movement during the intake stroke. The selected sample volume is drawn into the tip 28 when the piston assembly moves upward from its lower position determined by the lower stop 102 to its upper position determined by the upper stop 84. Alternatively the user withdraws the lower stop 102 out of the path of the piston assembly so that the piston assembly can overtravel and move farther in the downward direction during the discharge stroke.

The stop 102 includes a pair of scissors-like stop arms 104 (FIGS. 8–10) pivotally mounted by a pair of pivot pins 106. Each arm 104 includes a generally semicircular stop portion 108 and a radially extending tail portion 110. A spring 112 biases the tails 110 apart and the stop portions 108 toward each other to a normal position seen in FIG. 8. In this position, the ends of arms 108 contact each other, and the opening between the arms 108 is gibbous, less than a full circle.

The stop arms 104 are received in a groove 114 in the body 22 near the bottom of the handle member 24. The pivot pins 106 are seated in the body 22 and extend into the groove 114. In the normal position of the arms 104, the upper cap 50 of the piston assembly 46 cannot pass through the opening between the stop portions 108, and the stop portions limit the downward axial movement of the piston assembly 44 during the intake stroke.

When the cap 50 descends to the stop 102, diametrically opposite sides of the cap 50 simultaneously contact the stop portions 108. The lower surfaces of the stop portions 108 are each provided with a triangular array of three support feet 116 that encompass the region where the portions 108 are contacted by the cap 50. The feet 116 transfer the force applied by the cap 50 to the body 22, and provide a balanced system in which only axial forces are applied to the cap 50 and the piston assembly.

A lower stop actuator 118 (FIGS. 12 and 13) permits the user positively to control the axial movement of the piston assembly 44 by selectively opening the lower stop 102 during a discharge stroke. The actuator 118 includes a push button portion 120 and an elongated shank 122 slidably received for movement in the axial direction in a groove 124 in the handle member 24 of the body 22 (FIG. 5). The push button portion 120 is accessible to the user at the top of the handle member 24. A leaf spring 126 under the push button portion 120 biases the actuator toward its upper position seen in the drawings.

The lower end of the actuator 118 includes a guide extension 128 that is normally received in a clearance space provided between the ends of the stop portions 108 of the stop arms 104. When the user presses the push button portion 120 down and overcomes the force of the leaf spring 126, inclined cam surfaces 130 above the guide extension 128 force the stop portions 108 apart against the force of the spring 112. The stop arms 104 move to the open or withdrawn position seen in FIG. 9. In this position, the opening between the stop portions 108 is at least a full circle, larger than the cap 50 of the piston assembly 44. A window 132 in the shank 122 aligned with the counter wheels 98 and window 100 in the body 22 prevents the actuator 118 from obscuring the display 34.

Before the completion of a discharge stroke, the user depresses the push button portion 120 of the actuator 118 to open the stop arms 104. The cap 50 moves downward beyond the lower stop 102. This overtravel assures that the entire liquid sample is expelled. The cap 50 can move down until it contacts the top of the spring spacer 36. The top of the spring spacer 36 provides a second lower stop that is effective during the discharge stroke when the first lower stop 102 is withdrawn.

Figure 4:
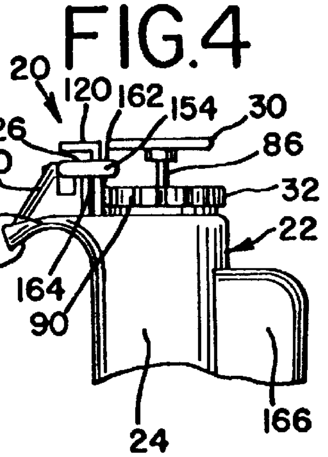
FIG. 4 is a fragmentary view similar to the upper portion of FIG. 1 showing the piston push button in a lower position.

The push button portion 120 of the lower stop actuator is located near the front of the top of the handle member 24, directly in front of the piston push button 30. As a result, it is easy and convenient for the user to press only the piston push button 30 for an intake stroke, and to simultaneously press both the push button 30 and the push button portion 120 for a discharge stroke. FIG. 4 illustrates the position of the push button 30 at the lowermost position of an intake stroke. In this position, the button 30 and the button portion 120 are at the same elevation. For an intake stroke, no further thumb movement is used. For a discharge stroke, the user presses the button 30 with the ball of the thumb, then contacts the button portion 120 with the tip of the thumb while continuing to press the button 30 with the ball of the thumb to positively control the stop 102.

A tip ejection mechanism generally designated as 134 (FIGS. 15 and 16) forces the tip 28 from the tubular base 26 of the body 22 after a discharge stroke and before the next intake stroke. The mechanism 134 includes a lower ejector member 136 mounted for axial movement on the tubular base 26. An upper mounting collar 138 encircles the coupling nut 40. A lower sleeve 140 at least partially encircles the lower portion of the base 26 adjacent to the upper edge of a tip 28 mounted on the base (FIG. 1). An arm 142 extends between the collar 138 and the sleeve 140.

A generally U shaped bail member 144 includes a lower bight portion 146 and a pair of axially extending legs 148 axially movable in internal passageways formed in the handle member 24. The bail is releasably attached by a snap fit into a slot in a mounting boss 150 on the upper mounting collar 138 of the lower ejector member 136. The upper ends of the legs 148 include right angled feet 152 (FIG. 15) engaging an actuating lever 154.

A pivot mounting pin 156 spans a mounting slot 158 in a mounting projection 160 at the top and front of the handle member 24. A central portion of the actuating lever 154 is located in the slot 158 and is pivotally mounted on the pin 156. The lever 154 includes a pair of similar button portions 162 extending to both sides of the projection 160. Springs 164 encircle the upper portions of the legs 148 between the top of the handle member 24 and the bottom of the actuating lever 154 in order to bias the lever 154 to the illustrated horizontal position.

Figure 15:
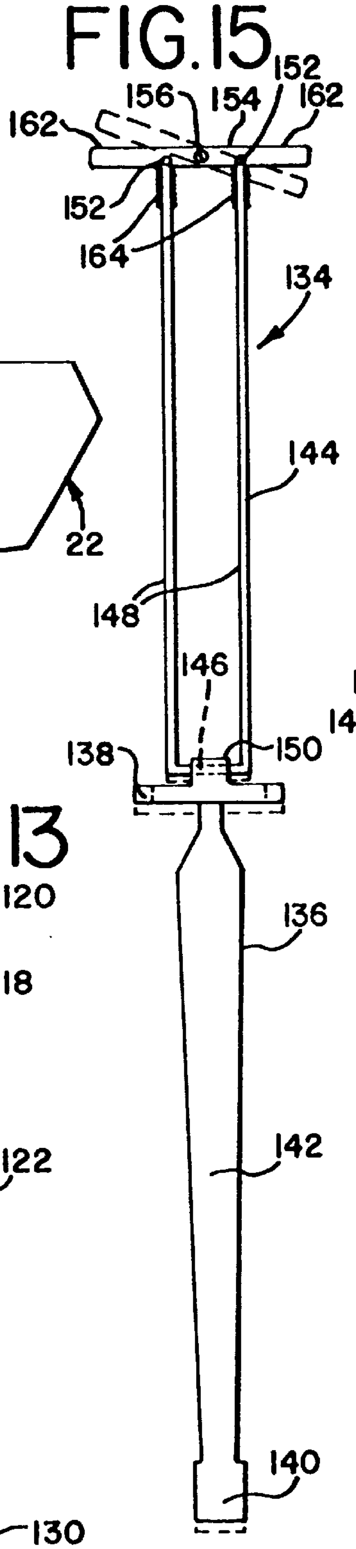
FIG. 15 is a front view of the tip ejection mechanism of the pipette.
Figure 16:
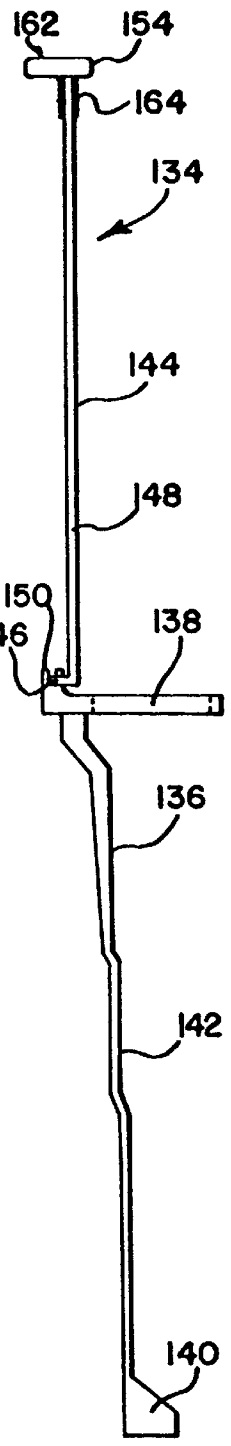
FIG. 16 is a side view of the mechanism of FIG. 15.
Figure 12:
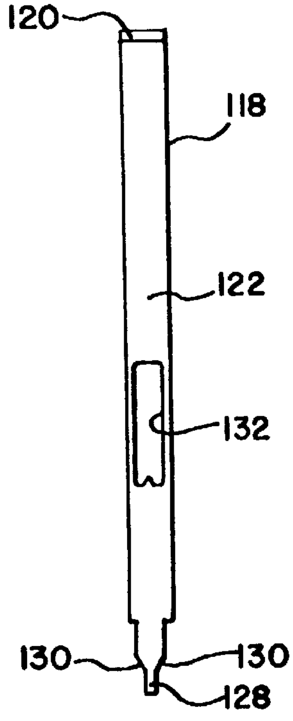
FIG. 12 is a front view of the lower stop actuator of the pipette.
Figure 13:
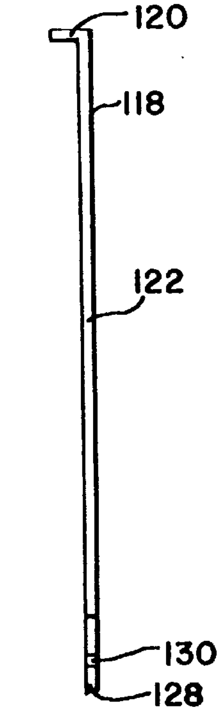
FIG. 13 is a side view of the actuator of FIG. 12.

To eject a tip 28 from the base 26, the user presses one of the button portions 162. The lever pivots as seen in FIG. 15 and pushes the bail member 144 down against the return forces provided by the springs 164. The bight 146 in turn forces the lower ejector member 136 down and the lower edge of the sleeve 140 engages the upper edge of the tip 28, pushing it out of frictional engagement with the base 26. One of the two alternative actuated positions of the tip ejection mechanism 134 is seen in broken lines in FIG. 15. The abrupt release of the frictional holding force causes the tip 28 to quickly move free of the base 26.

The lever 154 provides a mechanical advantage by approximately doubling the force applied to the ejector member 136 as compared with mechanisms where the user presses axially on a button attached to the end of an actuator rod. The mechanical advantage results from the fact that the thumb may press against an end of the lever 154 at a point about twice as far from the pivot pin 156 as the feet 152. The increase in ejection force is an advantage because tips 28 may be forced tightly onto the base 26 and may be so difficult to remove that repetitive tip ejections may be difficult and tiring for the user.

The location of the button portions 162 near the front of the top of the handle portion makes it easy and natural for the user to apply the tip ejection force with the thumb. It is not necessary for the thumb to be flexed back to reach a button at the rear of the handle. In addition, because the lever 154 includes two button portions 162, the user can operate the ejection mechanism 134 by pressing a button portion at either side of the projection 160. The arrangement accommodates both right and left handed users, and also permits the user to select the more comfortable side or to vary the tip ejection motion to reduce fatigue.

As best seen in FIG. 3, the piston push button 30, the lower stop actuator push button 120 and the tip ejector button portions 162 are arrayed generally in a T shape. The push button 30 is located at the axis of the handle portion and the axis of the piston assembly 44. The push button 120 and the button portions 162 are located forward of the push button 30, with the push button 120 directly forward of the push button 30 and the button portions 162 located at opposite sides of the push button 120. This array is convenient and easily operated by the user with minimal fatigue and discomfort.

In a cycle of operation, the user presses push button 30 to the lower position defined by the lower stop 102 and releases the push button 30 during an intake stroke. Then the user presses the push button 30 to initiate a discharge stroke. When the push button 30 nears the lower stop 102, the tip of the thumb is used to press the push button 120 while the ball of the thumb continues to press the push button 30. The lower stop 102 is opened and the piston assembly overtravels and completes the discharge stroke. After the piston assembly returns to its upper position, the user presses one of the button members 162 to eject the tip 28. The sequence of motions is easily performed with no awkward movements and no necessity for appreciable user strength or manipulative skill.

Figure 11:
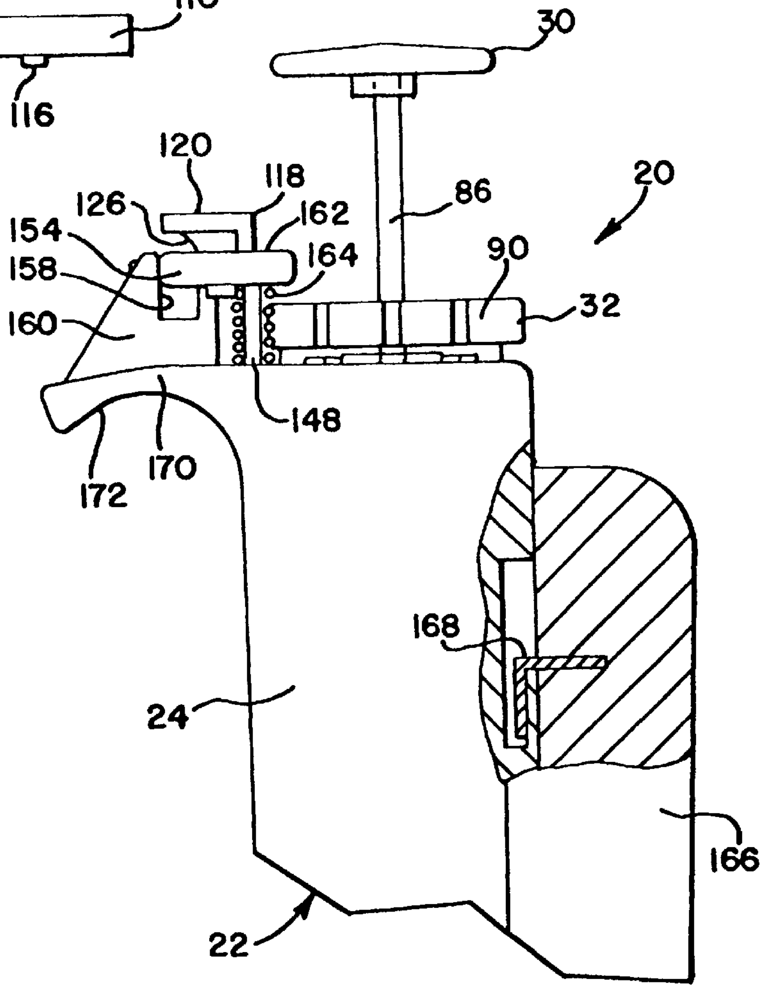
FIG. 11 is an enlarged, fragmentary side view of the pipette, partly in section.
Figure 14:
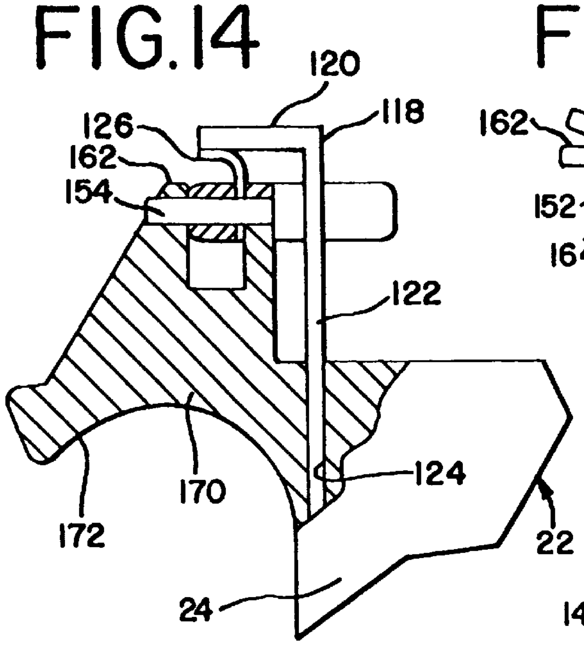
FIG. 14 is a greatly enlarged fragmentary side view, partly in section, of part of the top of the pipette.

The shape of the handle member 24 can be customized for large or small hands. A palm extension 166 is removably attached to the rear of the handle member 24 by a mounting flange member 168 (FIG. 11). A user with a small hand can remove the extension 166 and more easily grip the handle member 24 and reach the push button 120 and the button portions 162 with the thumb. A user with a larger hand can mount the extension 166 for a comfortable grip and better control of the pipette 20.

A lip 170 extends forward from the front of the top of the handle member 24. The lip 170 includes a downwardly sloping end surface 172 that embraces the forefinger of a user. When the user presses push buttons 30 or 120 or button portions 162, the lip 170 applies the reaction force to the forefinger of the user. The downwardly sloped surface 172 makes it easy for the user to hold and control the pipette 20, and makes it possible to suspend the pipette from the fingers alone.

Figure 17:
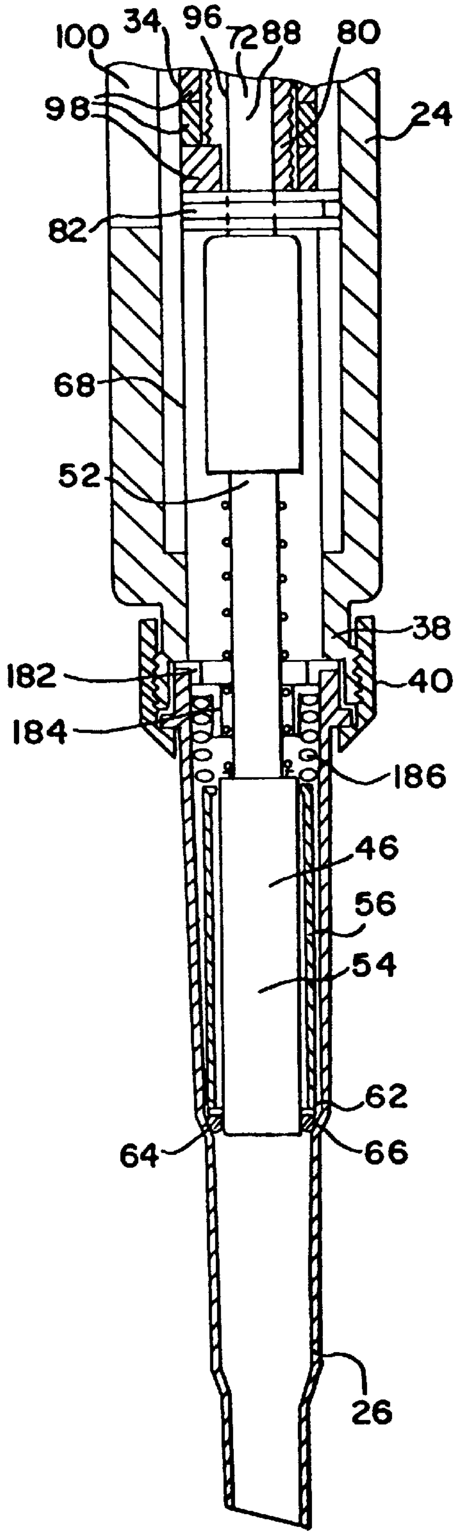
FIG. 17 is a fragmentary, enlarged, axial sectional view similar to FIG. 5 showing a pipette that is an alternative embodiment of the invention.
Figure 18:
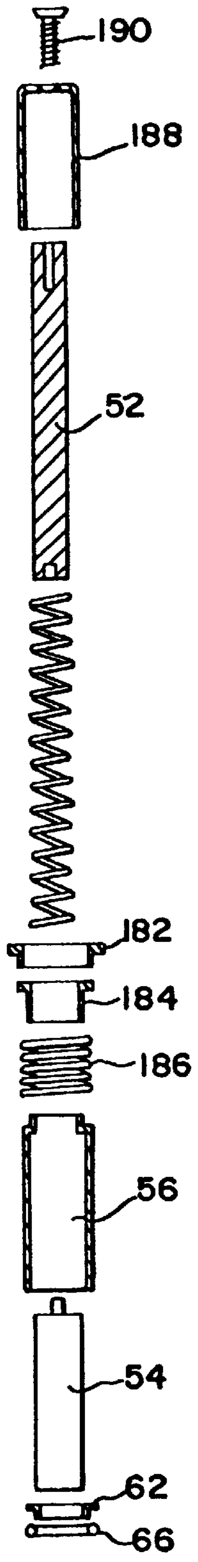
FIG. 18 is an enlarged, exploded elevational view of components of the pipette of FIG. 17, including parts of the piston assembly and the piston seal arrangement.

Referring now to FIGS. 17 and 18, there is illustrated as an alternative embodiment of the invention a pipette generally designated as 180. In many respects the pipette 180 may be similar to the pipette 20 shown in FIGS. 1–16, and similar reference characters are used to designate similar elements of the structure.

Pipette 20 does not include a positive lower stop. Instead, in accordance with a feature of the invention, pipette 20 is provided with a dual spring overtravel arrangement constituting an improvement over similar arrangements used in the past.

More specifically, pipette 180 includes a first spacer 182 having an annular flange that is captured in a fixed position between the coupling nut 40 and the threaded collar 38 of the handle 24. A second spacer 184 contacts the bottom of the first spacer 182. An overtravel spring 186 is held in compression between the spacer 184 and the top of the sleeve 56. The first spacer 182 serves as a fixed stop defining the uppermost position of the second spacer 184. The overtravel spring performs two functions. It provides a sealing force so that the seals 62 and 64 provide a fluid tight seal between the piston 54 and the base 26, and it permits the piston assembly 44 to overtravel during a discharge stroke when the second spacer 184 is forced down from its uppermost position seen in FIG. 17.

An elongated hollow cap sleeve 188 is attached by a fastener 190 to the top of the piston shank 52. The upper portion of a piston return spring 192 is received in the annual space within the cap sleeve 188 and around the shank 52. The lower portion of the piston return spring extends through central axial openings in the first and second spacers 182 and 184 and bears against a collar at the top of the sleeve 56. The function of the spring 192 is to continually urge the piston assembly toward its normal, upper position seen in FIG. 17.

In known dual spring designs such as seen for example in U.S. Pat. No. 3,827,305, the piston return spring must be relatively short because it bears against the top of one spacer while the overtravel spring bears against the underside of an adjacent spacer. In the pipette 20 the piston return spring is substantially longer because rather tan bearing against the top of a spacer, it extends through the spacers 182 and 184 and extends within the overtravel spring 186. This telescoped spring arrangement provides important advantages.

To begin a cycle of operation, the piston assembly is pressed down until the bottom of the cap sleeve 188 contacts the top of the second spacer 184. This contact defines the end of the downward movement during the intake stroke. Because of the length of the piston return spring 192, is not greatly compressed at this time. As a result, a relatively small spring force applied by the user is sufficient. User fatigue is reduced. In addition, because the piston return spring force is low, it is relatively easy for the user to feel the contact against the spacer 184 and the force applied by the overtravel spring 186. It is therefore possible to use an overtravel spring having relatively less force, sufficient to create the seal between the base 26 and piston 54. Reducing the overtravel spring force also reduces user fatigue.

While the present invention has been described with reference to the details of the embodiment of the invention shown in the drawing, these details are not intended to limit the scope of the invention as claimed in the appended claims.

What is claimed is:

1. A pipette tip ejector assembly for ejecting a tip held by friction on the lower tubular base of a pipette having an axially extending body including a handle having a top, said assembly comprising:

a pusher assembly including a lower part adapted to contact the tip to be ejected;

said pusher assembly including an actuator extending axially upwardly from said lower part to the region of said top of said handle;

a pivot fulcrum located at said top of said handle; and a double ended operating lever having a center pivotally supported by said pivot fulcrum and extending in two directions from said pivot fulcrum;

said lever engaging said actuator for moving said actuator axially in response to pivoting of said lever wherein said lever is operable from either end for engaging said actuator.

2. A pipette tip ejector assembly as claimed in claim 1, said actuator including a pair of axially extending members, and said lever being pivotally supported at said center and overlying both of said members.

3. A pipette tip ejector assembly as claimed in claim 2, said lever extending beyond said members and having button portions at the ends of said lever, said button portions being located farther from said center than said members.

* * * * *